S. E. BALL.
WEEDER.
APPLICATION FILED MAR. 31, 1910.
960,247.
Patented June 7, 1910.
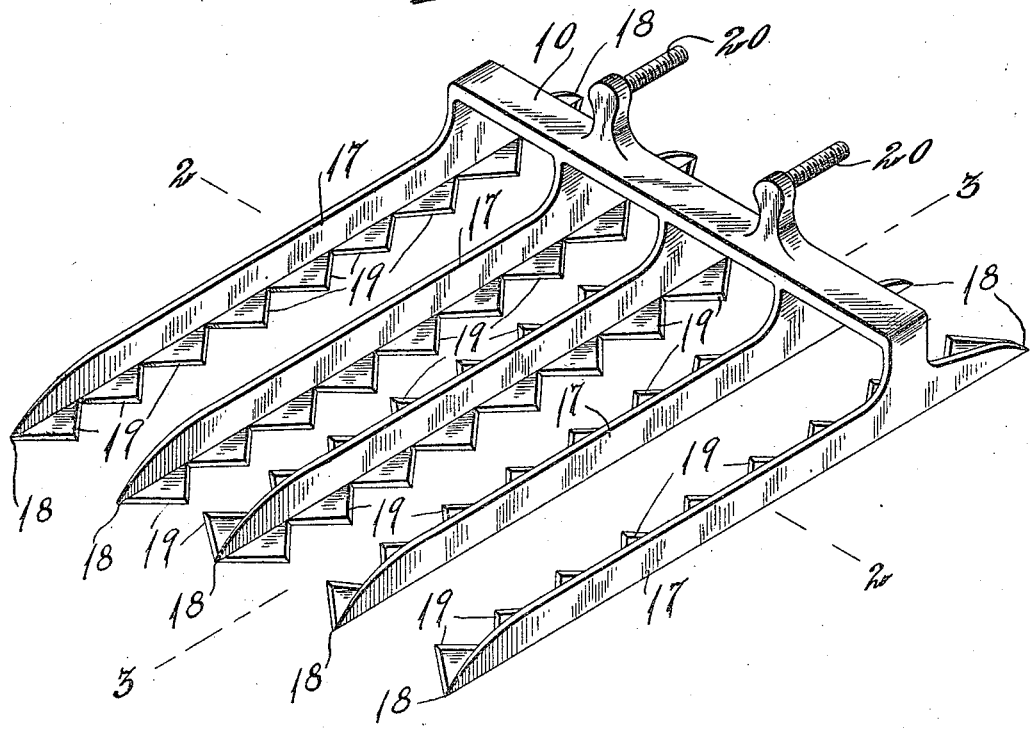
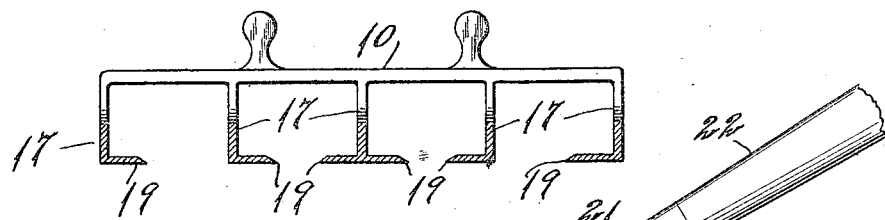
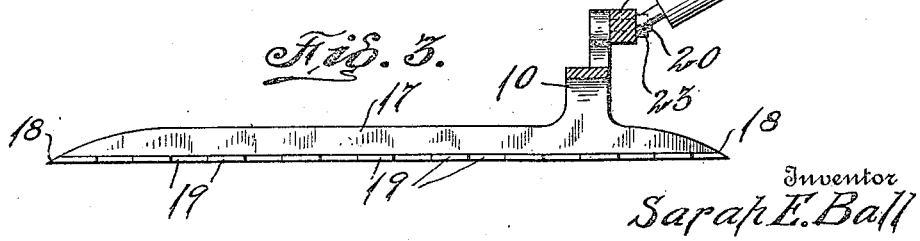
Witnesses
Jos Gregory
C. N. Woodward.
Inventor
Sarah E. Ball
By Chandlee & Chandlee
Attorneys

# UNITED STATES PATENT OFFICE.

SARAH E. BALL, OF RITCHEY, ILLINOIS.

WEEDER.

960,247.  Specification of Letters Patent.  Patented June 7, 1910.

Application filed March 31, 1910. Serial No. 552,625.

*To all whom it may concern:*

Be it known that I, SARAH E. BALL, a citizen of the United States, residing at Ritchey, in the county of Will, State of Illinois, have invented certain new and useful Improvements in Weeders; and I do hereby declare the following to be a full, clear, and exact description of the invention, such as will enable others skilled in the art to which it appertains to make and use the same.

This invention relates to garden implements, more particularly to the class known as weeders, or implements to destroy weeds, and which may also be employed for loosening the soil in the neighborhood of plants and for like purposes.

Another object of the invention is to provide a simply constructed implement which may be drawn over the soil and operated in two directions.

Another object of the invention is to provide an implement which may be employed as a weeder or as a "trowel" or to form apertures in the soil to receive the plants.

With these and other objects in view, the invention consists in certain novel features of construction as hereinafter shown and described and then specifically pointed out in the claims; and, in the drawings illustrative of the preferred embodiment of the invention, Figure 1 is a perspective view of the improved implement, Fig. 2 is a transverse section on the line 2—2 of Fig. 1, Fig. 3 is a section on the line 3—3 of Fig. 1, with the handle attached.

The body portion of the improved device is preferably constructed from one single piece either cast or forged, and will preferably be of steel, and comprises a head 10 and a plurality of bars 17 extending from the head and spaced at equal distances apart. The bars 17 are preferably flat vertically and terminate in points 18 at their free ends. Extending laterally from each of the bars are V-shaped cutting blades 19, similar in shape to the knives of a mowing machine, as shown. An uneven number of the bars 17 will preferably be employed and for the purpose of illustration five of the bars are shown, but it will be understood that any required number may be employed, and the head 10 and the bars 17 may be of any required size and of any required strength.

By employing an uneven number of the bars a central bar will always be present in the construction, and two sets of the blades 19 are employed upon the central bar and extending in opposite directions, as shown. The blades 19 of the remaining bars will be directed toward the central bar from one side, as shown.

A suitable handle is connected to the head member 10, and for the purpose of illustration the head member is provided with spaced threaded studs indicated at 20, and fitting over these studs is the T-head member 21 of a handle 22, the member 21 being secured in position by clamp nuts 23. By this means the handle and the weeder structure may be separated when required. The handle 22 will preferably be located at an angle to the longitudinal plane of the bars 17, so that when operated the blades 19 may be moved over the earth in parallel relations thereto, and thus be operated without fatigue. The various blades 19 are spaced from the bars 17 and from each other to provide a space for the entrance of the weed stocks when the implement is being used.

It will thus be obvious that an efficient and convenient implement is produced whereby weeds may be expeditiously destroyed when the implement is drawn forwardly and backwardly over the ground. By arranging the blades 19 with the V-shaped cutting edges it will be obvious that the implement may be operated when moved in both directions, so that the weeds will be severed at both the forward and the return stroke of the implement. This very materially increases the efficiency and utility of the device and likewise materially increases the speed with which it is actuated. When the blades 19 become dulled they can be readily sharpened with a file or grindstone in the same manner as mowing machines are sharpened.

What is claimed is:—

1. In an implement of the class described a plurality of bars spaced apart and each bar formed with a plurality of V-shaped cutting blades extending laterally therefrom.

2. In an implement of the class described, a head, a plurality of bars spaced apart and extending from said head, and a plurality of V-shaped cutting blades extending laterally from each of said bars.

3. In an implement of the class described, a central bar and a plurality of bars spaced apart at each side of said central bar, a plurality of V-shaped cutting blades extending laterally from each side of the central bar, and V-shaped cutting blades extending laterally from one side of each of the remaining bars and directed toward the central bar.

4. In an implement of the class described, a head, a central bar extending from said head, a plurality of bars spaced apart and extending from said head at each side of the central bar, a plurality of V-shaped cutting blades extending from said central bar at each side thereof, and a plurality of V-shaped cutting blades extending from one side of each of said side bars and directed toward the central bar.

5. In an implement of the class described, a head having threaded studs extending from one side and a plurality of bars spaced apart and extending from the other side, a plurality of V-shaped cutting blades extending laterally from each of said bars, and a T-member engaged by said studs and having a handle extending therefrom.

6. An implement of the class described comprising a head, a plurality of bars spaced apart and extending from said head and at right angles thereto, a plurality of V-shaped cutting blades extending laterally from each of said bars, and means for connecting a draft appliance to said head.

In testimony whereof, I affix my signature, in presence of two witnesses.

SARAH E. BALL.

Witnesses:
  FRANCIS MILLER,
  IDA WALTON.